United States Patent [19]

Poduje et al.

[11] Patent Number: 4,958,129
[45] Date of Patent: Sep. 18, 1990

[54] PREALIGNER PROBE

[75] Inventors: Noel S. Poduje, Needham Heights; Roy E. Mallory, Bedford, both of Mass.

[73] Assignee: ADE Corporation, Bedford, Mass.

[21] Appl. No.: 320,237

[22] Filed: Mar. 7, 1989

[51] Int. Cl.⁵ .......................................... G01R 27/26
[52] U.S. Cl. ................................. 324/661; 324/690
[58] Field of Search ............. 324/61 R, 61 P, 158 F, 324/158 P, 662, 661, 690

[56] References Cited

U.S. PATENT DOCUMENTS

| | | | |
|---|---|---|---|
| 3,694,741 | 9/1972 | Abbe | 324/60 |
| 3,706,919 | 12/1972 | Abbe . | |
| 3,771,051 | 11/1973 | Abbe | 324/61 |
| 3,775,678 | 11/1973 | Abbe | 324/60 |
| 3,775,679 | 11/1973 | Abbe | 324/61 |
| 3,805,150 | 4/1974 | Abbe | 324/61 R |
| 3,812,424 | 5/1974 | Abbe | 324/61 |
| 3,815,111 | 6/1974 | Abbe | 340/213 |
| 3,986,109 | 10/1976 | Poduje | 324/61 |
| 3,990,005 | 11/1976 | Abbe et al. | 324/61 |
| 4,008,433 | 2/1977 | Fasser et al. | 324/61 P |
| 4,158,171 | 6/1979 | Abbe et al. | 324/158 |
| 4,217,542 | 8/1980 | Abbe et al. | 324/57 |
| 4,228,392 | 10/1980 | Abbe et al. | 324/61 |
| 4,353,029 | 10/1982 | Abbe et al. | 324/236 |
| 4,457,664 | 7/1984 | Judell et al. | 414/779 |
| 4,646,009 | 2/1987 | Mallory | 324/158 |
| 4,692,695 | 9/1987 | Poduje | 324/158 |
| 4,750,141 | 6/1988 | Judell et al. | 364/550 |

Primary Examiner—Reinhard J. Eisenzopf
Assistant Examiner—Maura K. Regan
Attorney, Agent, or Firm—Weingarten, Schurgin, Gagnebin & Hayes

[57] ABSTRACT

An edge detection system for measuring lateral position in the presence of height variations such as found in gauging the edge position of a wafer uses first and second capacitive probes formed of passive elements with the active components kept outside the probe and at a distance that permits a smaller, stabler and more economical probe to be located at the location of the wafer. The probes are instrumented in an electronic circuit having plural operational amplifiers that drive the probes to compensate the edge detection for wafer height effects.

19 Claims, 3 Drawing Sheets

PREALIGNER PROBE

FIELD AND BACKGROUND OF THE INVENTION

In the handling of semiconductor wafers in automated testing systems it is necessary to correctly position each wafer so that it can be passed from test station to test station with a known position and orientation. To establish that orientation, it is the practice in the art to perform an alignment on each wafer as taught in commonly assigned U.S. Pat. No. 4,457,664, Issued July 3, 1984.

Such an alignment involves detecting the edge positions of a wafer and repositioning it according to a predetermined alignment protocol. The edge is sensed by spinning the wafer over a capacitive sensitive edge detector, and misalignment and flat information is computer processed to identify the wafer movements necessary for it to be aligned according to the protocol.

As wafer processing technology becomes able to utilize wafers that might otherwise have failed to be acceptable for processing, it becomes necessary for the alignment system to deal with such wafers. One way that wafers can be less than perfect is to exhibit warp and bow distortions. These distortions can add an error term to the process of edge detection in the form of a displacement of the wafer not affecting the edge position, but affecting capacitance from the wafer. With such variations in displacement, come additional variations produced by the fringe field's complex dependence on the gap of the capacitive sensor.

Probes used to gauge semiconductor wafers in this environment are preferably small, stable, efficient to build and easy to adjust.

BRIEF SUMMARY OF THE INVENTION

According to the teaching of the present invention, a wafer alignment system is disclosed having passive probes that are easy to manufacture and adjust, stable and small in size.

In the preferred embodiment of the invention, first and second passive capacitive probes are oriented in close proximity to the edge of a wafer being aligned so that one probe is sensitive to both wafer edge position and probe to wafer gap while the other probe is only sensitive to the probe to wafer gap induced by bow and warp distortions.

All active circuitry is confined to remotely located electronics which implement height and edge detection from the parameters sensed by the probes. The electronics include plural operational amplifiers that effectively drive the signal used to excite the probe that is used to sense both the edge and the gap with a signal developed from the probe used to sense only the gap. The edge or lateral sensing probe is placed in the input circuit of one amplifier to provide an output directly proportional to displacement. Additional circuitry is used to compensate the edge detection signals for the complex errors attributable to the changes in fringe fields due to the bow and warp distortions of the semiconductor wafer, including the use of processing circuitry that compensates for finite, non zero wafer slopes. A separate output reflecting gap is provided.

DESCRIPTION OF THE DRAWING

These and other features of the present invention are more fully set forth below in the solely exemplary detailed description and the accompanying drawing of which.

DETAILED DESCRIPTION OF THE INVENTION

The present invention contemplates a system of operational amplifiers which compensate for height variations in position sensing, more particularly a semiconductor wafer edge detection system for a wafer aligner where errors from the distortions of the wafer in bow and warp are neutralized.

Figure 1:
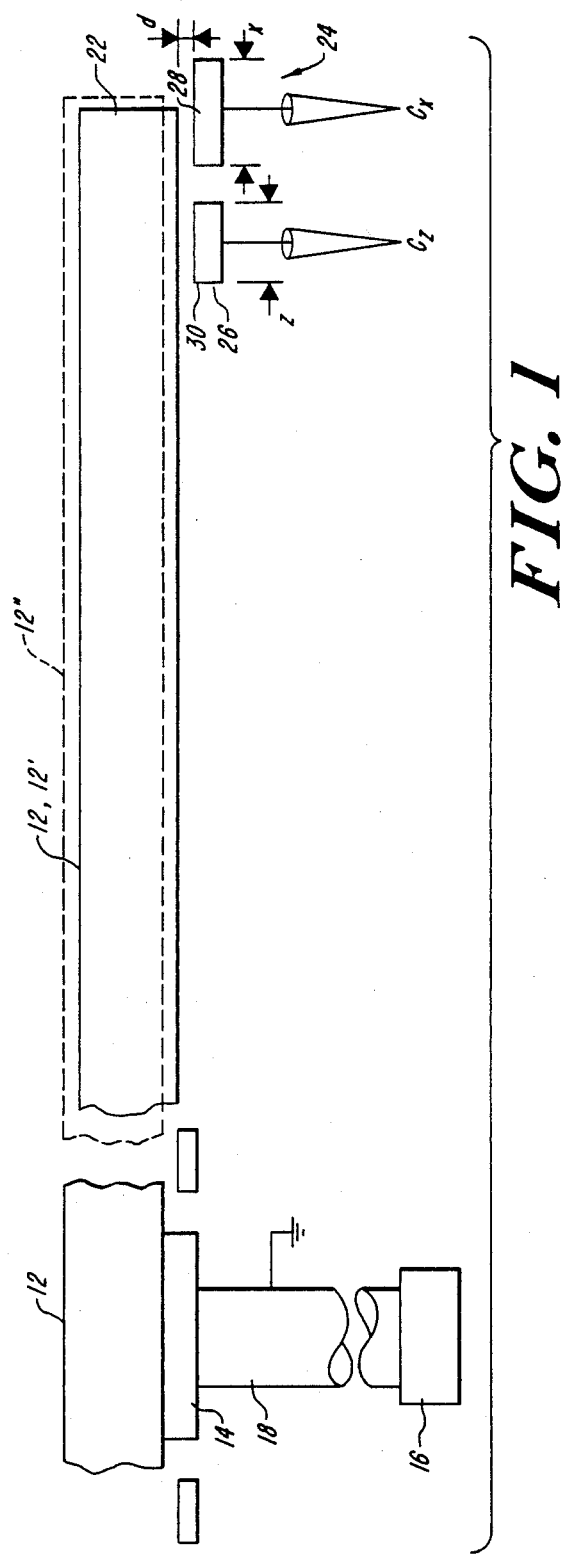
FIG. 1 is a diagram of the wafer distortion correction system of the present invention for use in edge detection.

In the context of the wafer aligner as shown in FIG. 1, a semiconductor wafer 12, only partially shown, is placed on a vacuum chuck 14 where it may be rotated and translated for alignment by a motive system 16 through a shaft 18 as shown in the above-identified U.S. Pat. No. 4,457,664 incorporated herein by reference. When not supported by the vacuum chuck 14, the wafer 12 may rest upon supports for transport to other portions of a wafer processing system.

The wafer 12 has a portion 12' which deviates from the normal position for the wafer at 12" due to bow and warp distortions. In order to detect an edge 22 of the wafer a set of first and second probes 24 and 26 are positioned to capacitively gauge the gap to the wafer 12. The first probe 24 is sensitive in the capacitance sensed by its electrode 28 to both the position of the edge 22 and the gap "d" to the wafer 12. The second probe 26 is sensitive only to the gap between its electrode 30 and the wafer. Both probes are sensitive to fringe field effects, but the fringe field of the electrode 28 is complicated by the geometry resulting from the edge 22 and the electrode portion that extends beyond the edge 22. This complexity is compounded by the variation in the gap "d" with bow and warp distortion.

Figure 2:
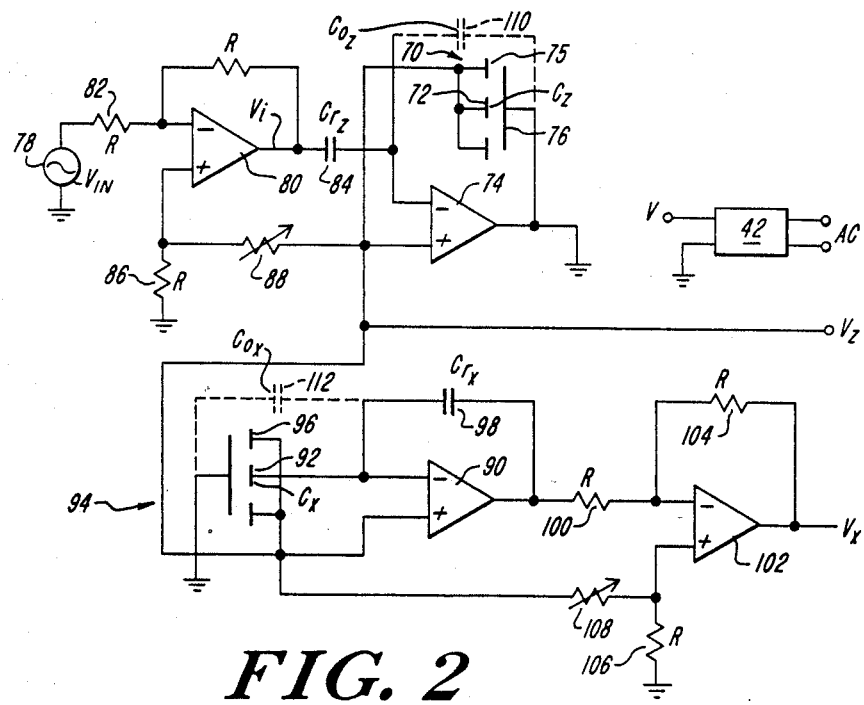
FIG. 2 is a circuit diagram of system electronics.

In a preferred circuit embodiment, illustrated in FIG. 2, a vertical or d-axis dimension probe 70 comprises a central electrode 72 and surrounding guard electrode 75, connected respectively to inverting and non-inverting inputs of an operational amplifier 74. The output of the amplifier 74 is grounded and connected to an element 76 that the probe 70 is to gauge.

An A.C. drive signal is provided by a source 78 between ground and the inverting input of an amplifier 80 through a resistor 82. The output of the amplifier 80 is applied through a reference capacitor 84 to the inverting input of amplifier 74. The non-inverting input of amplifier 80 is grounded through a resistor 86 and connected through a variable resistor 88 to the non-inverting input of amplifier 74.

The circuitry for sensing the combined X and d-dimensions is coupled into the non-inverting input of amplifier 74, tying that connection to the non-inverting input of an operational amplifier 90. The inverting input of amplifier 90 is connected to a center electrode 92 of a probe 94. A guard electrode 96 of probe 94 is connected to the non-inverting input of amplifier 90. The output of amplifier 90 is fed back through a reference capacitor 98 to the inverting input and through a resistor 100 to the inverting input of an operational amplifier 102. The output of operational amplifier 102 is fed back through a resistor 104 to the inverting input and forms the output signal, Vx, proportional to the X dimension, compensated for variations in d. The non-inverting input of amplifier 102 is grounded through a resistor 106 and coupled through a variable resistor 108 to the non-inverting input of amplifier 90.

The circuitry of amplifier 80 provides compensation for circuit non ideal conditions through adjustment of resistor 88. This compensates for the lack of ideal gain in amplifier 74 and fringe or stray capacitance represented by a capacitor 110. Similarly resistor 108 allows adjustment to compensate for a stray capacitance 112 associated with probe 94.

Mathematically, using the terms defined in the drawings and dealing first with the top half of the FIG. 2 circuit, $$V_z = (C_{rz}/(C_z + C_{oz}))(V_i - V_z)$$

$$V_i = -V_{in} + V_z A,$$

where A is controlled by resistor 88.
Then $$V_z = (C_{rz}/(C_z + C_{oz}))(-V_{in} + V_z A - V_z)$$

$$V_z/V_{in} = (-C_{rz})/(C_z + C_{ox} - AC_{rz} + C_{rz})$$

by adjusting resistor 88 to satisfy $$C_{oz} - AC_{rz} + C_{rz} = O$$

then $$V_z/V_{in} = -C_{rz}/C_z$$

$$C_z = K_z/d$$

(where electrode 30 dimensions are normalized), then $$V_z = -V_{in}C_{rz}d/K_z$$

Dealing now with the lower half of the circuit.
The output $V_x$ is seen to be:

$$V_x = -V_z(1 + (C_x + C_{ox})/C_{rx}) + AV_z$$

where A is controlled by resistor 108.

$$V_x = -V_z(C_{rx} + C_x + C_{ox} - AC_{rx})/C_{rx}$$

by adjusting A, it is possible for:

$$C_{ox} + C_{rx} - AC_{rx} = 0$$

then $$V_x = -V_z C_x/C_{rx}$$

using $$V_z = -V_{in}C_{rx}d/K_z$$

$$C_x = (WX\epsilon)/d$$

where

X is the normalized edge position and W is electrode 28 width, (preferably and optimally a narrow width is advantageous for resolution).

$V_x$ then becomes $V_{in}(C_{rx}/C_{rx})\epsilon WX/K_z$ varying directly and only with X. The other factors are constants set by the circuitry or probe parameters.

Figure 3:
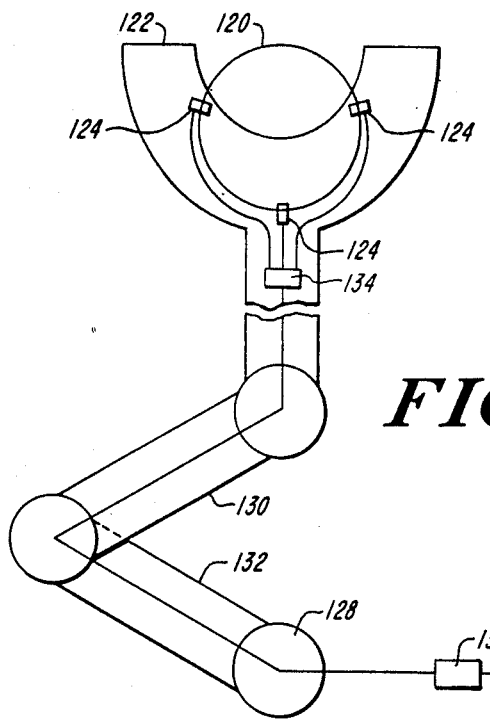
FIG. 3 is a top view of a multi probe position sensor using the invention.

In FIG. 3 there is shown a semiconductor wafer 120 on a hand or end effector 122. Plural probe modules 124 are provided which include a separate X and d electrode of the type illustrated by probes 24 and 26 respectively. The probes are positioned so that the edges of the wafer 124 are located above the X sensing electrodes.

The hand 122 may additionally be a terminal end effector of a robot arm as shown in U.S. Pat. application Ser. No. 07/051,090, Filed May 15, 1987, (ADE-37) commonly assigned and specifically incorporated herein by reference. As such, the hand 122 is independently driven in radial, angular and elevation directions by a drive mechanism 128 through linked arms 130 and 132.

Position outputs of each probe's circuitry 134 can be analyzed by electronics 136 off the robot arm to detect the position of the wafer center on hand 122 using standard triangulation analysis, or for other purposes.

Figure 4:
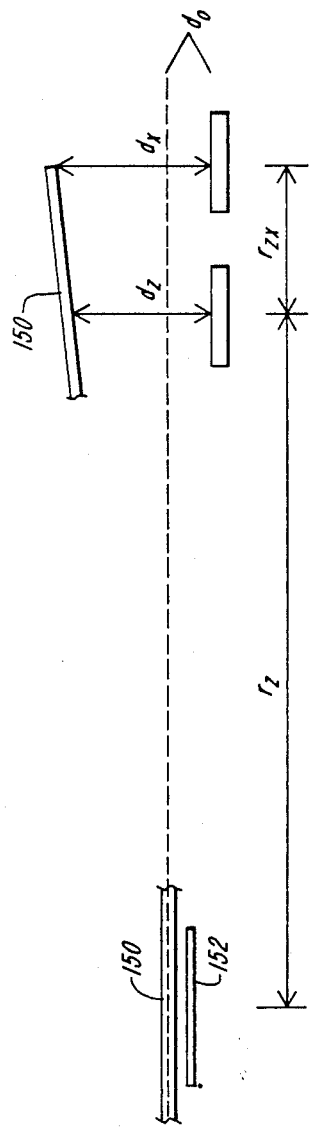
FIG. 4 illustrates a further feature of the invention.

As further illustrated in FIG. 4 a wafer 150 on a prealigner platform 152 can be distorted such that, for at least some portion of its gauged position, it angles up or down at a non zero slope, exaggerated in the figure. As a result, the height of the wafer, above or below the gap sensing electrode 30 will be less than that further out at the edge sensing electrode 28 by some function of the gap at the gap electrode 30. This causes an error to exist in the gap signal provided to the amplifier 90 at its noninverting input.

Figure 5:
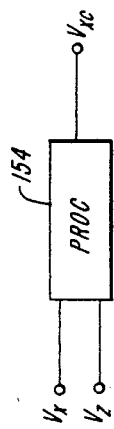
FIG. 5 shows a diagram of circuitry for use with the FIG. 4 feature.

To avoid this error, the circuitry of FIG. 5 is used to condition the amplifier 102 output. While the actual gap at the edge electrode 28 may be a complex function of the gap at electrode 28 and can be corrected for such a complex error, it is usually sufficient to correct for first order errors assuming a linear slope for wafer 150 from the platform 152 to the electrodes 28 and 30. The edge signal from amplifier 102 is typically applied to a processor 154 (and associated keyboard and display) capable of performing a calculation with its input signals. The processor 154 receives, as input, the $V_z$ and $V_x$ signals from the FIG. 2 circuitry. The compensation for slope is developed by the processor 154 to develop a compensated output signal $V_{xc}$ using the relationship:

$$V_{xc} = V_x B(V_z)$$

where $B(V_z)$ is a correction faction depending only on constants and the single variable $V_z$ developed as follows:

Because $d_z$ does not equal $d_x$, $V_x$ from FIG. 2 is $$V_x = (V_{in}C_{rx}WX/(C_{rx}K_z))(d_z/d_x);$$

a correction factor $B = d_x/d_z$ applied to $V_x$ gives $V_{xc}$, $V_x$ corrected for linear slope $$V_{xc} = V_x B;$$

using the relationships shown on FIG. 4, $$B = d_x/d_z = 1 + ((d_z - d_o)/d_z)(r_{zx}/r_z);$$

since the ratio $$d_o/d_z = V_o/V_z$$

holds for $V_o = V_z$ when $d_z = d_o$, then $$B = 1 + ((V_z - V_o 0/V_z)(r_{zx}/r_z).$$

Processor 154 implements this algorithm. The various constants can be provided in the stored program that implements the equation and may be set by keyboard entry.

The probe system of the present invention illustrated above is intended as exemplary only. The compensation scheme can be realized in other forms and accordingly it is intended to limit the scope of the invention only in accordance with the following claims.

We claim:

1. A system for capacitive edge detection of a supported member comprising:
    a member where the position of an edge of said member is to be detected;
    a first probe positioned proximate to said member near the edge thereof and having a parameter varying as a function both of a distance from said probe to said member and displacement of a portion of said probe beyond the edge of said member;
    a second probe positioned near said first probe and closer to an interior location of said member than said first probe, said second probe having a parameter varying with distance of said second probe from said member;
    a first operational amplifier having the capacitance sensed by the electrode of the first probe in a feedback loop thereof;
    a second operational amplifier having the capacitance sensed by the electrode of the second probe in an input circuit thereof and;
    a source of A.C. excitation driving said first operational amplifier.

2. The system of claim 1 including means for supporting said member at the center thereof.

3. The system of claim 2 including means for rotating said member about its center.

4. The system of claim 3 further including means for repositioning said supported member on said support means in response to said indication of edge position to be more centered on said support means.

5. The system of claim 2 wherein said support means includes a vacuum chuck.

6. The system of claim 1 wherein said member is a semiconductor wafer.

7. The system of claim 1 wherein said first probe includes a capacitance sensing electrode.

8. The system of claim 7 wherein said second probe includes a capacitance sensing electrode.

9. The system of claim 8 wherein said first and second probe electrodes have a surface area facing said member of approximately the same effective area.

10. The system of claim 8 further including a guard around each said capacitance sensing electrode.

11. The system of claim 10 further including means for maintaining a virtually identical potential on each said guard and associated electrode.

12. The system of claim 1 further including a third operational amplifier connected to receive an output of said second operational amplifier.

13. The system of claim 12 further including a coupling between said second and third amplifiers compensating for errors sensed by said second probe.

14. The system of claim 1 further including means for compensating an output of said second operational amplifier for differences in distances between said member and said first and second probes respectively.

15. A system for capacitively gauging distance comprising:
    a first capacitance sensing electrode spaced a distance from a member at a location adjacent to an edge thereof;
    a second capacitance sensing electrode spaced a distance from the member at location interior to the edge thereof;
    an operational amplifier connected to said first electrode;
    a source of A.C. excitation connected to said second electrode, said second electrode providing an output representative of distance from said second electrode to the member for input to a non-inverting input of said operational amplifier;
    said operational amplifier providing an output signal varying directly with the displacement of said first electrode from an edge of the member.

16. The system of claim 15 wherein said first electrode includes a guard and means for driving said guard at the virtual potential of said first electrode.

17. The system of claim 15 further including circuit means for compensating said output for effects attributable to stray capacitance.

18. The system of claim 15 further including circuit means for compensating said output for effects attributable to less than infinite gain of said operational amplifier.

19. An edge detection system comprising:
    first probe means at a first location for providing a first output representation of its distance from a member;
    second probe means at a second location for providing a second output representation of its distance from said member in combination with its displacement from an edge of said member;
    means for compensating said second output with an estimate of what said first output would be if said first output were provided at the second location of said second probe means.

* * * * *

UNITED STATES PATENT AND TRADEMARK OFFICE
CERTIFICATE OF CORRECTION

PATENT NO. : 4,958,129
DATED : September 18, 1990
INVENTOR(S) : Noel S. Poduje

It is certified that error appears in the above-identified patent and that said Letters Patent is hereby corrected as shown below:

Column 3, line 65, "$C_{rx}d$" should read --$C_{rz}d$--.

Column 4, line 5, "$(C_{rx}/C_{rx})$" should read --$(C_{rz}/C_{rx})$--.

Column 4, line 17, "application" should read --Application--.

Column 4, line 55, "faction" should read --factor--.

Column 5, line 8, "$((V_z - V_o 0/$" should read --$((V_z - V_o)/$--.

Signed and Sealed this

Twentieth Day of October, 1992

Attest:

DOUGLAS B. COMER

Attesting Officer   Acting Commissioner of Patents and Trademarks